United States Patent
Ichihashi

(10) Patent No.: US 9,876,938 B2
(45) Date of Patent: Jan. 23, 2018

(54) IMAGE PROCESSING APPARATUS, IMAGE PROCESSING METHOD, AND COMPUTER PROGRAM

(75) Inventor: Yukichika Ichihashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 13/310,472

(22) Filed: Dec. 2, 2011

(65) Prior Publication Data

US 2012/0140250 A1 Jun. 7, 2012

(30) Foreign Application Priority Data

Dec. 6, 2010 (JP) ................................. 2010-271696

(51) Int. Cl.
| | | |
|---|---|---|
| H04N 1/41 | (2006.01) | |
| H04N 7/24 | (2011.01) | |
| G09G 5/00 | (2006.01) | |
| H04N 1/405 | (2006.01) | |
| H04N 1/40 | (2006.01) | |

(52) U.S. Cl.
CPC ....... *H04N 1/4051* (2013.01); *H04N 1/40062* (2013.01)

(58) Field of Classification Search
CPC ... H04N 1/41; H04N 7/24; G09G 5/00; G06F 3/1247; G06F 3/1267; G06F 3/122
See application file for complete search history.

(56) References Cited

U.S. PATENT DOCUMENTS

| | | | | |
|---|---|---|---|---|
| 4,474,462 A | * | 10/1984 | Ogawa ................. | G03G 15/041 355/57 |
| 4,581,582 A | * | 4/1986 | Redington ..................... | 324/309 |
| 5,957,450 A | * | 9/1999 | Kida et al. ..................... | 271/291 |
| 5,960,229 A | * | 9/1999 | Fukuoka ............ | H04N 1/00681 358/488 |
| 6,215,914 B1 | * | 4/2001 | Nakamura et al. ........... | 382/284 |
| 7,925,085 B2 | * | 4/2011 | Sugimoto ..................... | 382/169 |
| 8,031,935 B2 | * | 10/2011 | Shiraishi ....................... | 382/163 |

(Continued)

FOREIGN PATENT DOCUMENTS

| | | |
|---|---|---|
| CN | 1298256 A | 6/2001 |
| JP | 61206365 A | 9/1986 |

*Primary Examiner* — John Wallace
*Assistant Examiner* — Darryl V Dottin
(74) *Attorney, Agent, or Firm* — Canon U.S.A., Inc. IP Division

(57) ABSTRACT

An image processing apparatus configured to execute variable magnification processing on an image includes a position determination unit configured to serially determine pixel insertion or removal positions in the image in a direction perpendicular to a direction of the variable magnification processing, and an insertion or removal processing unit configured to execute insertion or removal processing on pixels existing at the insertion or removal positions determined by the position determination unit. The position determination unit is configured to determine, within a range defined by a position distant from an immediately previously determined insertion or removal position by a first distance in the variable magnification processing direction and a position distant therefrom by a second distance in the variable magnification processing direction, a next insertion or removal position while referring to the immediately previously determined insertion or removal position.

11 Claims, 11 Drawing Sheets

(56) References Cited

U.S. PATENT DOCUMENTS

| | | | |
|---|---|---|---|
| 8,280,191 B1* | 10/2012 | Avidan | G06T 3/0012 |
| | | | 382/298 |
| 8,467,086 B2* | 6/2013 | Lee et al. | 358/1.2 |
| 8,606,048 B2* | 12/2013 | Kurigata | 382/300 |
| 2001/0015826 A1* | 8/2001 | Kurose | H04N 1/40062 |
| | | | 358/2.1 |
| 2006/0092264 A1* | 5/2006 | Matsuzaki et al. | 347/233 |
| 2007/0223043 A1 | 9/2007 | Sugimoto | |
| 2008/0089585 A1* | 4/2008 | Yashima | H04N 1/393 |
| | | | 382/173 |

\* cited by examiner

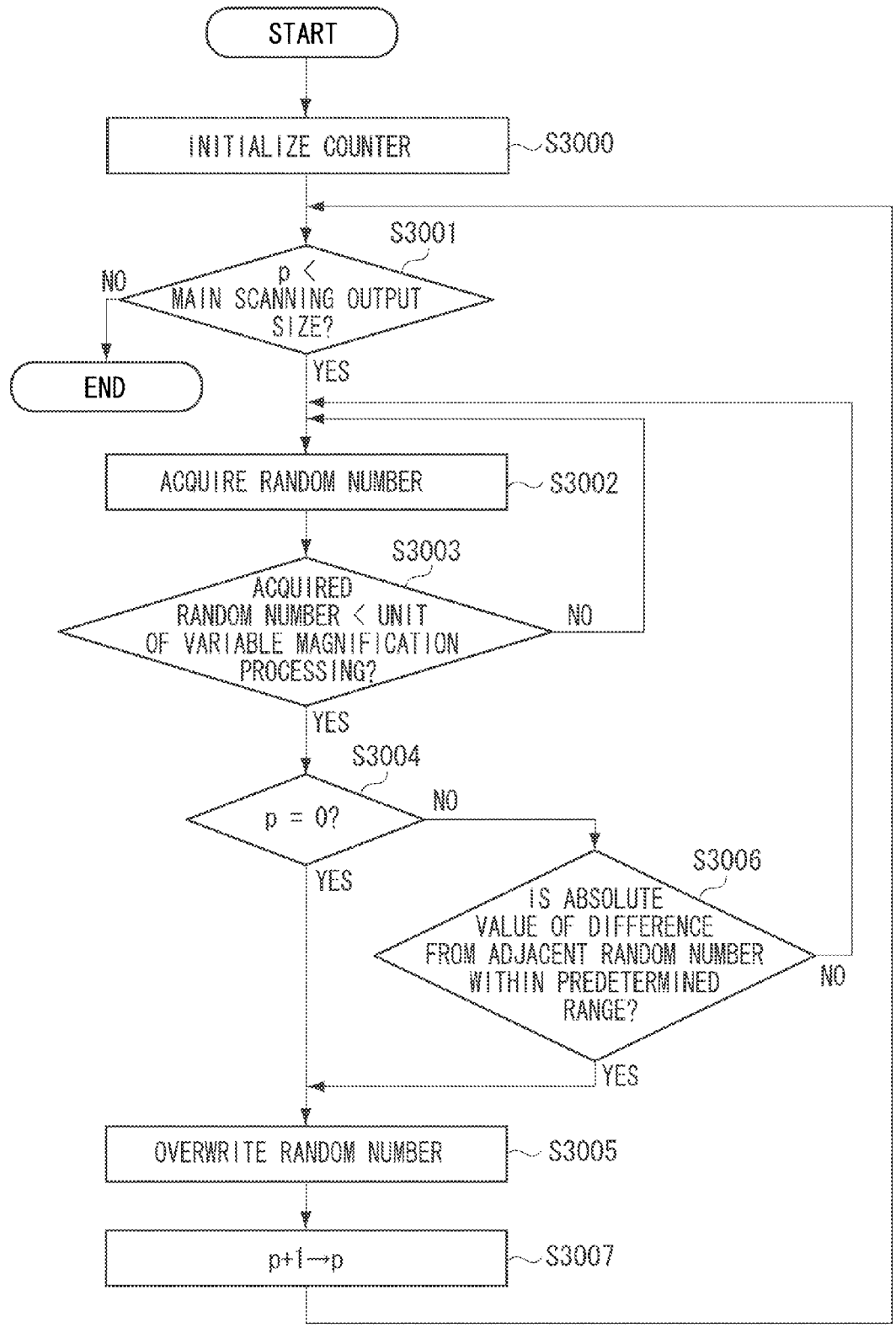

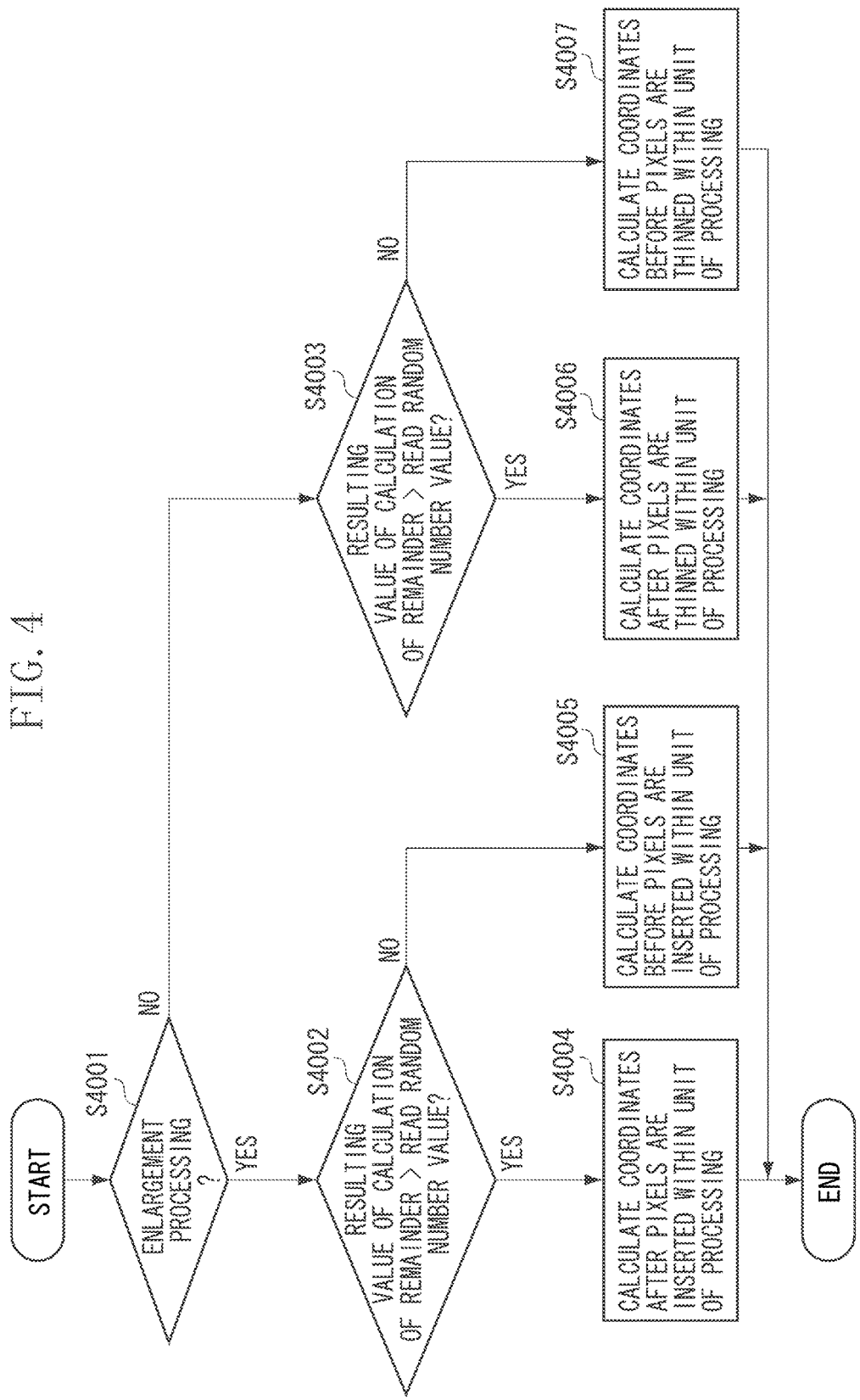

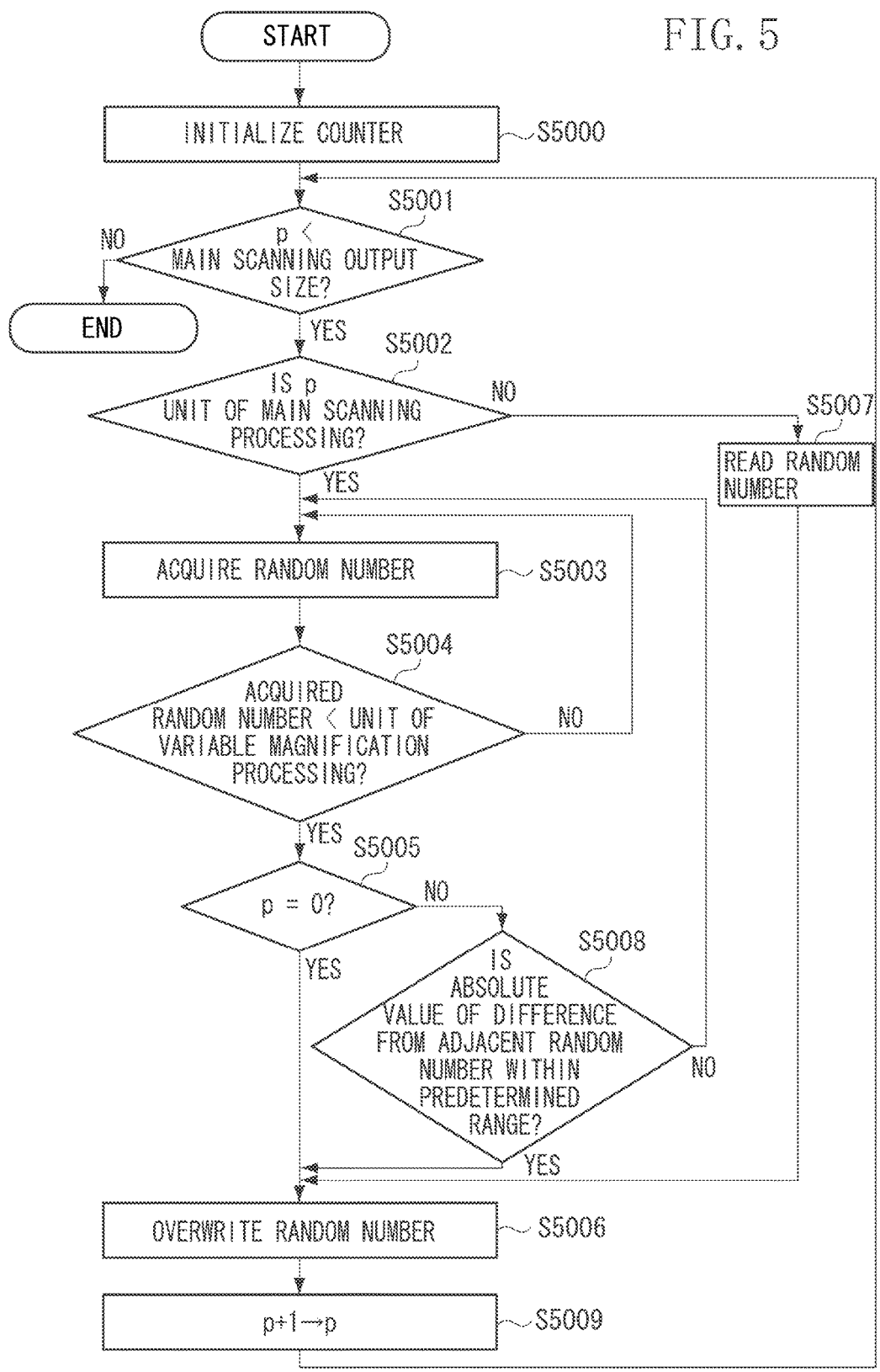

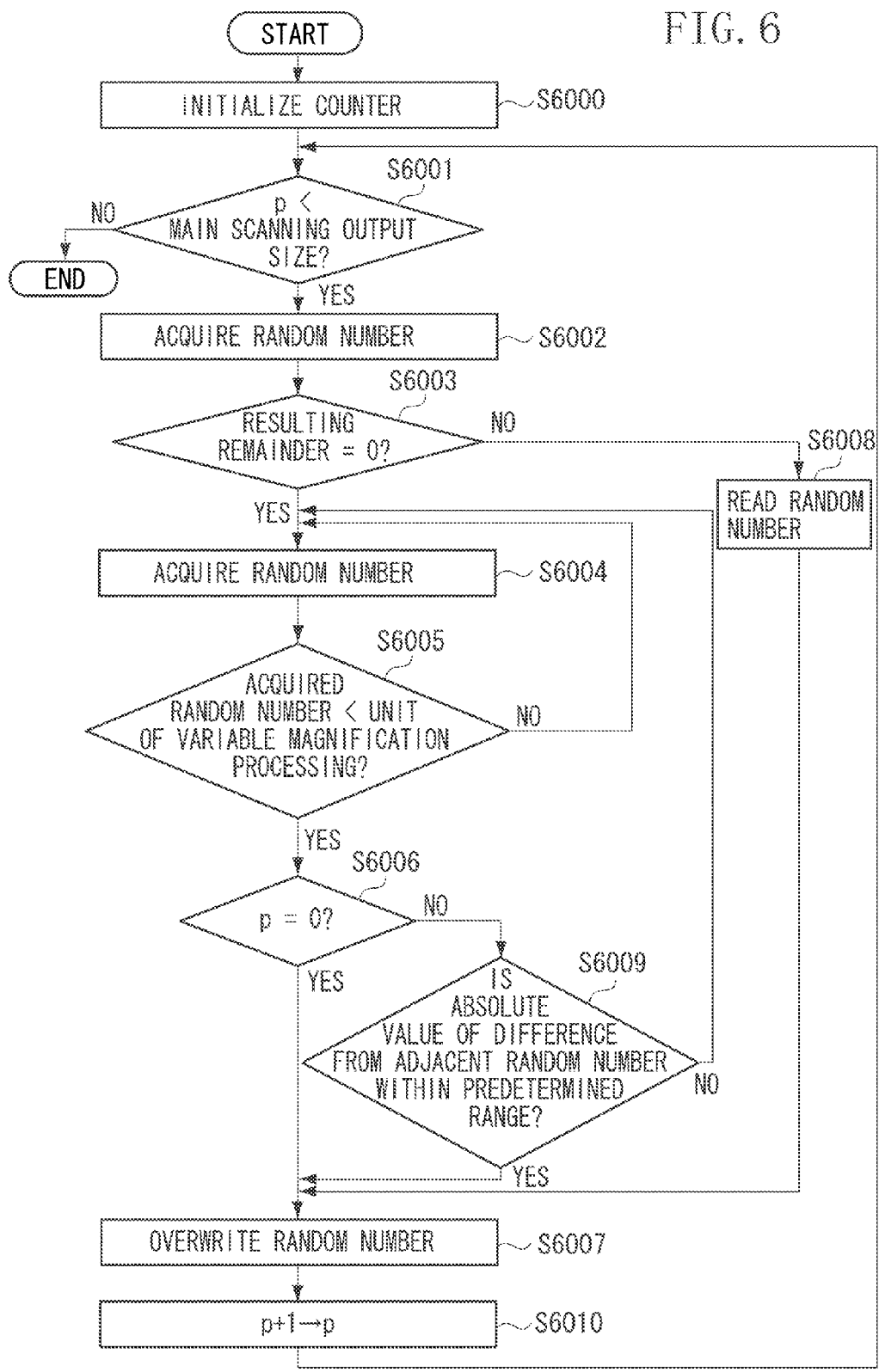

FIG. 7A
FIG. 7B
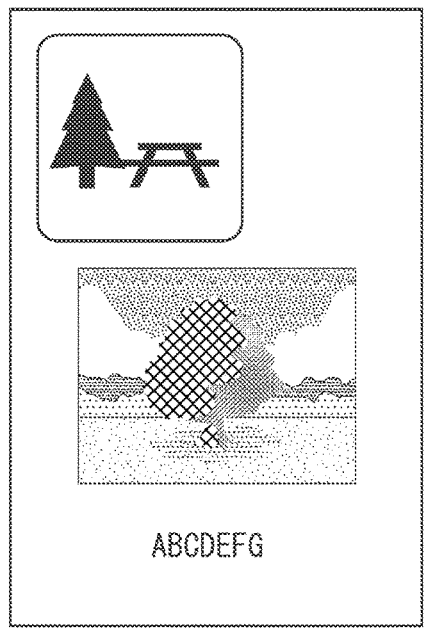
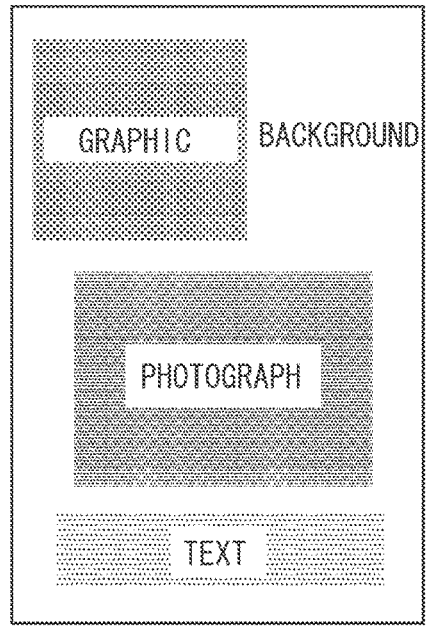

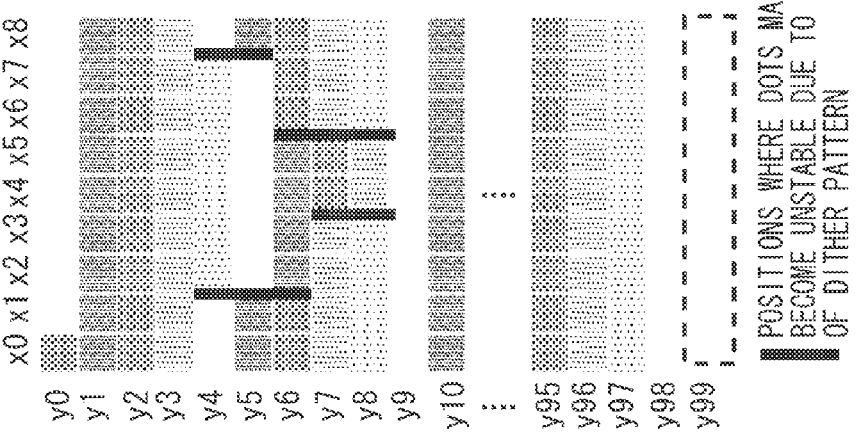
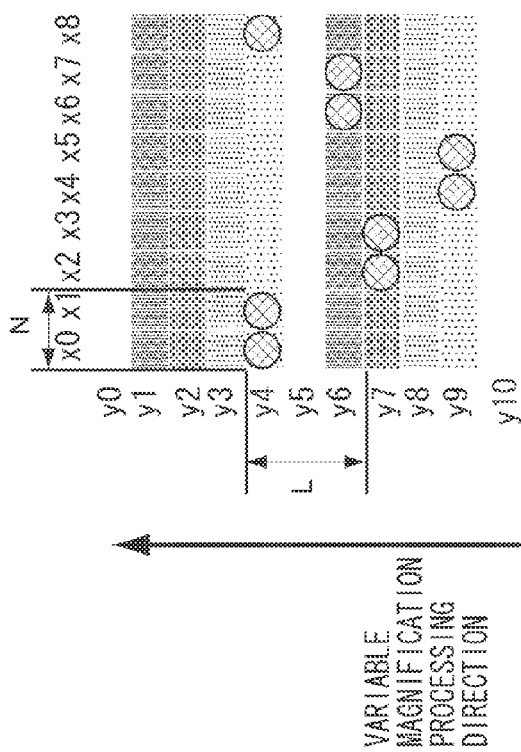

IMAGE PROCESSING APPARATUS, IMAGE PROCESSING METHOD, AND COMPUTER PROGRAM

BACKGROUND OF THE INVENTION

Field of the Invention

The present invention relates to an image processing apparatus, an image processing method, and a computer program therefor.

Description of the Related Art

The electrophotographic printing method utilizes heat and pressure at a stage of development processing, which is processing for fixing a toner including a pigment onto a sheet. When subjected to heat and pressure, the sheet may be contracted or expanded.

For a sheet that can be used on an electrophotographic printing apparatus, the above-described phenomenon of sheet contraction or expansion may arise remarkably on the first fixing stage but only a substantially ignorable displacement may occur in the second and subsequent fixing stages.

A printed image may become contracted or expanded as the sheet having the image printed thereon becomes contracted or expanded. Accordingly, the size of an image printed on the front surface of the sheet may become slightly different from an image printed on the back surface of the sheet. In a field for which a high printing accuracy is considered significant, it is necessary to correct the above-described difference.

In order to solve the above-described issue, a conventional method implements a countermeasure against a contracted or expanded sheet by adjusting image information to be printed itself. More specifically, Japanese Patent Application Laid-Open No. 61-206365 discusses a method for enlarging or reducing image information to be printed by executing insertion or thinning (hereinafter collectively referred to as "insertion or removal processing") of one pixel selected at random from among a predetermined number of pixels.

By executing insertion or removal processing at a pixel position determined at random, a halftone image can be enlarged or reduced with a high image quality by executing insertion or removal processing. However, if the position of a pixel of a halftone image on which the insertion or removal processing is to be executed (i.e., an insertion or removal position) is determined at random by using a random number, a dither pattern generated by dithering may be broken. As a result, when the image is printed, dots may become unstable.

Suppose that thinning is executed in a sub scanning direction at a position having coordinates (x, y) (x: main scanning position and y: sub scanning position). In this case, if thinning of once per one hundred lines is executed with a reduction rate of 1%, the random number can have the following values:

Random(x): 0-99 where the function Random(x) is a function for generating a random number based on the argument x.

Assuming that main scanning positions x0 and x1, at which thinning is to be executed, are located on mutually adjacent columns, that Random(x0)=2, and that Random (x1)=96, then pixels to be thinned off have coordinates (x, y)=(x0, y2), (x1, y96). To paraphrase this, as illustrated in FIG. 11A, the thinning positions are separate from each other by ninety-four lines in the sub scanning direction.

FIG. 11B illustrates a state in which designated pixels have been actually thinned off and the pixels are shifted as a result. At the main scanning position x0, the thinning is executed on the line y2. Accordingly, output positions on the line y3 and subsequent lines ascend in the sub scanning direction by one line. On the other hand, at the main scanning position x1, the line y96 is subjected to the thinning. Accordingly, output positions on the line y97 and subsequent lines ascend in the sub scanning direction by one line.

To paraphrase this, the lines y97 through y99 in the state illustrated in FIG. 11A are shifted to the lines y96 through y98 in the state illustrated in FIG. 11B only. Accordingly, the dither pattern between the main scanning positions x0 and x1 on the line y96 and subsequent lines (FIG. 11B) may not be broken. Furthermore, because the line y99 (a region surrounded by a broken-line rectangle illustrated in FIG. 11B) disappears, the image is successfully reduced by 1%.

On the other hand, for the lines y2 through y95, the main scanning positions x0 and x1, which exist adjacent to each other, become shifted away from each other due to thinning. Accordingly, the dither pattern may be generated in a broken state.

As illustrated in FIG. 11A, the pixels of different positions are thinned off on the main scanning positions x1 through x3. Accordingly, the pattern illustrated in FIG. 11B, which is a pattern after the thinning is completed, becomes different from the dither pattern before the thinning illustrated in FIG. 11A. As a result, image forming by the electrophotographic method may not be executed in a stable state because the image forming is executed based on the pattern different from the pattern before the thinning.

SUMMARY OF THE INVENTION

According to an aspect of the present invention, an image processing apparatus configured to execute variable magnification processing on an image by inserting or removing a pixel to and from the image includes a position determination unit configured to serially determine pixel insertion or removal positions in the image in a direction perpendicular to a direction of the variable magnification processing, and an insertion or removal processing unit configured to execute insertion or removal processing on pixels existing at the insertion or removal positions determined by the position determination unit. In the image processing apparatus, the position determination unit is configured to determine, within a range defined by a position distant from an immediately previously determined insertion or removal position by a first distance in the variable magnification processing direction and a position distant therefrom by a second distance in the variable magnification processing direction, a next insertion or removal position while referring to the immediately previously determined insertion or removal position.

According to an exemplary embodiment of the present invention, the possible degradation of a pattern of pixels included in an image can be restricted by restricting relative positions among pixels to be inserted or thinned off.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 3 is a flow chart illustrating an exemplary flow of the processing executed according to the first exemplary embodiment, which illustrates processing in step S2005 in detail.

FIG. 4 is a flow chart illustrating an exemplary flow of the processing executed according to the first exemplary embodiment, which illustrates processing in step S2008 in detail.

FIG. 5 is a flow chart illustrating exemplary variable magnification processing, which is executed according to a second exemplary embodiment of the present invention, which illustrates processing in step S2005 in detail.

FIG. 6 is a flow chart illustrating exemplary variable magnification processing, which is executed according to a third exemplary embodiment of the present invention, which illustrates processing in step S2005 in detail.

FIGS. 7A and 7B illustrate a halftone image and image information according to a fourth exemplary embodiment of the present invention, respectively.

FIGS. 10A and 10B illustrate exemplary variable magnification processing according to an exemplary embodiment of the present invention, which is executed by thinning pixels.

DESCRIPTION OF THE EMBODIMENTS

Various exemplary embodiments, features, and aspects of the invention will be described in detail below with reference to the drawings.

Figure 1:
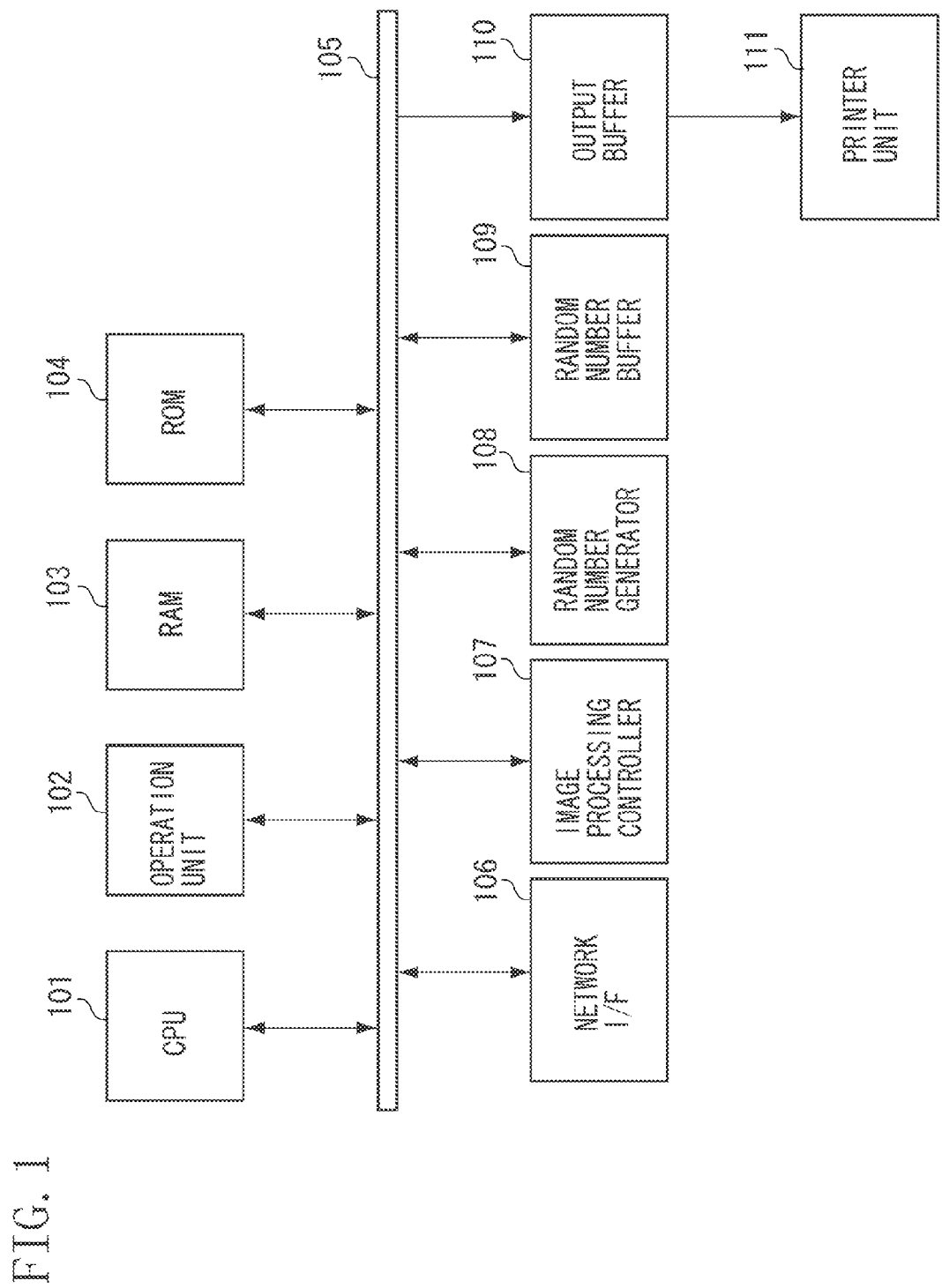
FIG. 1 is a block diagram illustrating an exemplary configuration of an image processing apparatus according to a first exemplary embodiment of the present invention.

FIG. 1 is a block diagram illustrating an exemplary configuration of an image processing apparatus according to a first exemplary embodiment of the present invention. The image processing apparatus includes a central processing unit (CPU) 101, a random access memory (RAM) 103, and a read-only memory (ROM) 104.

The CPU 101 loads a control program from the ROM 104 onto the RAM 103. Furthermore, by executing the control program on the RAM 103, the CPU 101 controls the image processing apparatus to operate. In addition, in executing the control program, the RAM 103 functions as a work memory for the CPU 101. Furthermore, the RAM 103 is utilized as a temporary storage area for temporarily storing data, such as a bitmap image.

In addition, the image processing apparatus includes an operation unit 102 and a network interface (I/F) 106. The operation unit 102 receives a setting of a variable magnification ratio, which is input by a user of the image processing apparatus. The CPU 101 stores the variable magnification ratio set by the user via the operation unit 102 on the RAM 103.

When two-sided printing of an image is executed by a printer unit (printing mechanism) 111, the variable magnification ratio is set at a value at which the position and size of an image to be printed on the back surface of a sheet is aligned with and adjusted to the position and size of an image to be printed on the front side of the sheet (i.e., a value determined according to the state of extension or contraction of the first surface of the sheet, on which printing is executed first).

For example, if the variable magnification ratio is designated at 99%, the image on the back surface is reduced by executing thinning on pixels of the image (halftone image) printed on the back surface of the sheet. On the other hand, if the variable magnification ratio is designated at 101%, the image on the back surface is enlarged by executing insertion processing on pixels of the image (halftone image) printed on the back surface of the sheet. Furthermore, if the variable magnification ratio is 100%, a direct-size image is printed on the back surface without executing the insertion or removal processing. In the present exemplary embodiment, processing for enlarging or reducing an image is collectively referred to as the "variable magnification processing".

In addition, the operation unit 102 and the network I/F 106 receive a print execution command from the user. If a document printed on a paper medium is to be copied, the CPU 101 receives the print execution command via the operation unit 102. Then, the CPU 101 stores a bitmap image of the document read by a scanner unit (not illustrated) on the RAM 103.

In printing the bitmap image that has been already stored on the RAM 103, the user inputs a command for printing the bitmap image from a host computer (not illustrated). The print execution command input by the user is transmitted to the CPU 101 via the network I/F 106 to execute printing of the image. In the following description, it is supposed that the bitmap image to be printed has been already stored on the RAM 103.

In addition, the image processing apparatus further includes an image processing controller 107, a random number generator 108, a random number buffer 109, an output buffer 110, and the printer unit (printing mechanism) 111.

The image processing controller 107 executes dithering on the bitmap image stored on the RAM 103 to generate a halftone image. The image processing controller 107 stores the generated halftone image on the output buffer 110. In addition, the image processing controller 107 stores the size of the halftone image on the RAM 103.

In the following description, for the size of the halftone image, a "main scanning direction input size" refers to the length of the halftone image in the main scanning direction. A "sub scanning input size" refers to the length of the halftone image in the sub scanning direction.

The random number generator 108 generates a random number sequence and stores the generated random number sequence on the random number buffer 109. In generating a random number sequence by using the random number generator 108, a publicly known method can be used, such as the Box-Muller transform. The method for generating a random number sequence, which is executed by the random number generator 108, does not limit the scope of the present invention.

In addition, the CPU 101 scans the halftone image stored on the output buffer 110 and executes variable magnification processing according to the random number sequence stored on the random number buffer 109. The halftone image, which has been subjected to the variable magnification processing, is transferred to the printer unit 111. The variable magnification processing is executed according to processing illustrated in the flow chart of FIG. 2.

The printer unit 111 acquires the halftone image that has been subjected to the variable magnification processing and executes image formation based on the acquired image. The printer unit 111 can print images on both surfaces of a recording medium, such as a sheet of paper.

In executing data communication among the above-described components of the image processing apparatus according to the present exemplary embodiment, such as the CPU 101, the operation unit 102, the RAM 103, the ROM 104, the network I/F 106, the image processing controller 107, the random number generator 108, the random number buffer 109, the output buffer 110, and the printer unit 111, data is transmitted and received via a bus 105.

In order to execute the above-described insertion or thinning of the halftone image, it becomes necessary to calculate coordinates of pixels to be inserted or thinned off. In the present exemplary embodiment, the CPU 101 executes the calculation. However, the unit that executes the calculation is not limited to the CPU 101. More specifically, a hardware circuit, such as a dedicated calculation circuit, can be separately provided to execute the calculation.

Figure 2:
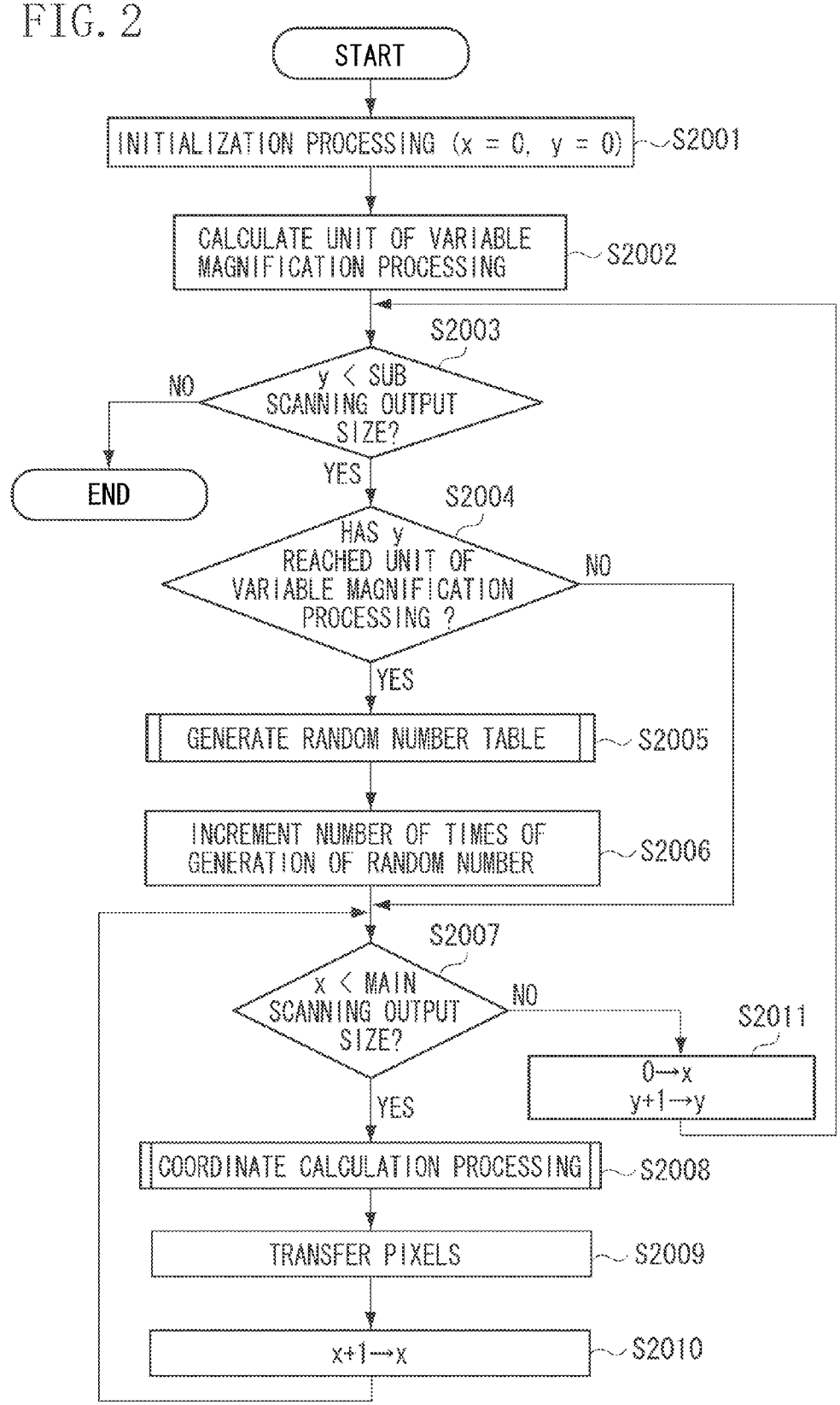
FIG. 2 is a flow chart illustrating exemplary variable magnification processing, which is executed by the image processing apparatus according to the first exemplary embodiment.

FIG. 2 is a flow chart of processing for calculating coordinates of pixels to be inserted or thinned off, which is executed by the CPU 101 while scanning the halftone image stored on the output buffer 110. The processing flow illustrated in FIG. 2 is implemented by the CPU 101 by loading and executing a control program from the ROM 104 on the RAM 103.

The flow of processing illustrated in FIG. 2 is a flow of variable magnification processing in which the sub scanning direction is set as the variable magnification processing direction. However, the flow of processing illustrated in FIG. 2 according to the present exemplary embodiment can be applied to variable magnification processing in the main scanning direction.

In the present exemplary embodiment, it is supposed that before executing the processing illustrated in FIG. 2, the variable magnification ratio has been already set by the user via the operation unit 102, that the CPU 101 has received a print execution command from the user, and that a halftone image that is yet to be subjected to the variable magnification processing has been stored on the output buffer 110.

FIGS. 10A and 10B illustrate exemplar variable magnification processing, which is executed according to the processing illustrated in FIG. 2. FIG. 10A illustrates an example of the halftone image stored on the output buffer 110 before executing the processing illustrated in FIG. 2. In the example illustrated in FIG. 10A, positions of pixels to be subjected to the insertion or removal processing (in FIG. 10A, the thinning processing) are illustrated. FIG. 10B illustrates the halftone image that has been subjected to the variable magnification processing (i.e., the state of the halftone image illustrated in FIG. 10A after the processing illustrated in FIG. 2 is executed).

The halftone image that has been subjected to the variable magnification processing is transferred to the printer unit 111. In the present exemplary embodiment, N (FIG. 10A)=1.

Referring to FIG. 2, in step S2001, the CPU 101 executes initialization processing. The initialization processing includes resetting of parameters x and y (x=y=j) and the allocation of a storage area on the RAM 103. The parameters x and y indicate the coordinate position of the halftone image that has been subjected to the variable magnification processing. In addition, in step S2001, the CPU 101 initializes the random number generation number-of-times counter c with a value "−1" (c=−1).

The parameter x denotes the coordinate position within the halftone image plane that has been subjected to the variable magnification processing in the main scanning direction. In the following description, the parameter x is described as the "main scanning position x". Similarly, the parameter y denotes the coordinate position within the halftone image plane that has been subjected to the variable magnification processing in the sub scanning direction. In the following description, the parameter y is described as the "sub scanning position y".

In step S2002, the CPU 101 calculates a unit of variable magnification processing based on the variable magnification ratio, which has been set via the operation unit 102 and stored on the RAM 103 by using the following expression:

$$\text{Unit of variable magnification processing (line)}=1/(\text{variable magnification ratio}).$$

In addition, in step S2002, the CPU 101 acquires the main scanning input size and the sub scanning input size from the RAM 103 and calculates the size of the halftone image (a main scanning output size and a sub scanning output size) that has been subjected to the variable magnification processing, which is generated by the variable magnification processing. Then, the processing advances to step S2003.

If variable magnification processing by 1% (0.01 time the original) is to be executed (regardless of whether the halftone image is to be enlarged or reduced), the unit of variable magnification processing is 100 (=1/0.01) lines. To paraphrase this, the insertion or thinning is executed once per one hundred lines.

In step S2003, the CPU 101 determines whether the sub scanning position y is smaller than the sub scanning output size. If the sub scanning position y is smaller than the sub scanning output size (YES in step S2003), the processing advances to step S2004. If the sub scanning position y is not smaller than the sub scanning output size (NO in step S2003), the processing ends.

In step S2004, the CPU 101 determines whether the remainder of division of the sub scanning position y by the unit of variable magnification processing calculated in step S2002 is "0". If it is determined that the remainder of division of the sub scanning position y by the unit of variable magnification processing calculated in step S2002 is "0" (YES in step S2004), then the processing advances to step S2005 to generate a random number table. On the other hand, if it is determined that the remainder of division of the sub scanning position y by the unit of variable magnification processing calculated in step S2002 is not "0" (NO in step S2004), then the processing advances to step S2007.

FIG. 3 is a flow chart illustrating an exemplary flow of processing for generating a random number table, which is executed in step S2005. The processing illustrated in FIG. 3 is implemented by executing the processing by the random number generator 108 and by the CPU 101 by loading and executing a control program from the ROM 104 on the RAM 103.

By executing the processing illustrated in FIG. 3, positions of insertion or removal, which are positions of pixels to be inserted or removed, are determined.

Referring to FIG. 3, in step S3000, the CPU 101 executes initialization of a random number position counter p (p=0). In addition, the CPU 101 secures a buffer size of the random number buffer 109 according to the main scanning output size. In the present exemplary embodiment, the position on the random number buffer 109 is uniquely determined according to the random number position counter p.

To increment the value of the random number position counter p by 1 corresponds to the increment of the main scanning position x by 1 in the main scanning direction (i.e., a direction perpendicular to the variable magnification processing direction). The position of insertion or removal, which is determined according to the random number position counter p, is the insertion or removal position determined immediately before the position of insertion or removal, which is determined by the random number position counter (p+1), which is a counter after the increment by 1.

In step S3001, the CPU 101 determines whether the random number position counter p is smaller than the main scanning output size stored on the RAM 103. If it is determined that the random number position counter p is smaller than the main scanning output size stored on the RAM 103 (YES in step S3001), then the processing advances to step S3002. On the other hand, if it is determined that the random number position counter p is equal to or greater than the main scanning output size (NO in step S3001), then the random number table generation processing ends and the processing advances to step S2006.

In step S3002, the random number generator 108 generates a random number and the CPU 101 acquires the random number generated by the random number generator 108. Then the processing advances to step S3003.

In step S3003, the CPU 101 determines whether the random number acquired in step S3002 is smaller than the unit of variable magnification processing. If it is determined that the random number acquired in step S3002 is smaller than the unit of variable magnification processing (YES in step S3003), then the processing advances to step S3004. On the other hand, if it is determined that the random number acquired in step S3002 is equal to or greater than the unit of variable magnification processing (NO in step S3003), then the processing returns to step S3002.

In step S3004, the CPU 101 determines whether the random number position counter p is "0". If it is determined that the random number position counter p is "0" (YES in step S3004), then the processing advances to step S3005. On the other hand, if it is determined that the random number position counter p is not "0" (that the random number is not at the start position) (NO in step S3004), then the processing advances to step S3006.

In step S3005, the CPU 101 overwrites and stores the acquired random number at the position of the random number buffer 109, which corresponds to the random number position counter p. The random number stored on the random number buffer 109 is used to determine the insertion or removal position. Then the processing advances to step S3007. In step S3007, the CPU 101 increments the random number position counter p by 1. Then the processing returns to step S3001. In other words, the insertion or removal positions are serially determined in the main scanning direction (the direction perpendicular to the variable magnification processing direction).

In step S3006, the CPU 101 determines whether the absolute value of the difference between the acquired random number and the random number stored at the location on the random number buffer 109 corresponding to the previous random number position counter (p−1) (an adjacent random number) is within a predetermined range (i.e., between a predetermined minimum value and a predetermined maximum value) by referring to the adjacent random number. The absolute value of the difference is equivalent to a distance L illustrated in FIG. 10A.

If it is determined that the absolute value of the difference is within the predetermined range (YES in step S3006), then the processing advances to step S3005. On the other hand, if it is determined that the absolute value of the difference exceeds the predetermined range (NO in step S3006), then the processing returns to step S3002.

The predetermined minimum value and maximum value restrict a possible relative distance of mutually adjacent pixels between the insertion or removal positions within a range defined by a first distance (the minimum value) and a second distance (the maximum value). The first distance and the second distance are determined according to the screen ruling and the resolution of the halftone image.

The effect of insertion or thinning off of a pixel at a specific position may become greater in generating a dot at another position for a halftone image having the resolution of 600 dots per inch (dpi) and the screen ruling of 100 lines per inch (lpi) than for a halftone image having the resolution of 600 dpi and the screen ruling of 200 lpi. Accordingly, the maximum value for the halftone image having a greater screen ruling in relation to the resolution is set smaller than the maximum value set to the halftone image having a less screen ruling in relation to the resolution.

Referring back to FIG. 2, in step S2006, the CPU 101 increments the random number generation number-of-times count value c by 1. The random number generation number-of-times count value c is used during the insertion or removal processing of pixels on the halftone image before being subjected to the variable magnification processing in executing coordinate calculation processing in step S2008, which will be described in detail later below. Then the processing advances to step S2007.

A pixel value corresponding to the main scanning output size is calculated in steps S2007 through S2010. In step S2007, the CPU 101 determines whether the main scanning position x is smaller than the main scanning output size.

If it is determined that the main scanning position x is smaller than the main scanning output size (YES in step S2007), then the processing advances to step S2008. On the other hand, if it is determined that the main scanning position x is equal to or greater than the main scanning output size (NO in step S2007), then the processing advances to step S2011.

In step S2011, the CPU 101 substitutes the main scanning position x with a value "0". In addition, the CPU 101 increments the sub scanning position y by 1. Then the processing returns to step S2003.

In step S2008, the CPU 101 uses the random number stored on the random number buffer 109 to execute processing for determining which pixel is to be transferred to the printer unit 111 for the halftone image that is yet to be subjected to the variable magnification processing, which has been stored on the output buffer 110 (coordinate calculation processing).

FIG. 4 is a flow chart illustrating an exemplary flow of the coordinate calculation processing. Referring to FIG. 4, in step S4001, the CPU 101 determines whether the variable magnification processing is enlargement processing. If the variable magnification processing is enlargement processing (YES in step S4001), then the processing advances to step S4002. On the other hand, if it is determined that the variable magnification processing is not enlargement processing (NO in step S4002), then the processing advances to step S4003.

In step S4002, the CPU 101 reads the random number stored when the random number position counter p=x in step S3005 from the random number buffer 109. In addition, the CPU 101 determines whether the read random number is smaller than the resulting remainder of division of the sub scanning position y by the unit of variable magnification processing. In other words, in step S4002, the CPU 101 determines whether the insertion of pixels within the unit of variable magnification processing at the main scanning position x of the halftone image that is currently scanned has been completed.

If it is determined that the read random number is smaller than the resulting remainder of division of the sub scanning position y by the unit of variable magnification processing (YES in step S4002), then the processing advances to step S4004. On the other hand, if it is determined that the read random number is equal to or greater than the resulting remainder of division of the sub scanning position y by the unit of variable magnification processing (NO in step S4002), then the processing advances to step S4005.

In step S4004, the CPU 101 executes a calculation for designating a pixel having a value (y−c−1), which is a value calculated based on the sub scanning position y, the random number generation number-of-times count value c, and one pixel to be inserted. To paraphrase this, in step S4004, the CPU 101 executes a calculation for designating a pixel having coordinates (x, y−c−1) within the plane of the halftone image that is yet to be subjected to the variable magnification processing as a pixel of the halftone image that has been subjected to the variable magnification processing and having coordinates (x, y). Then the processing advances to step S2009 (FIG. 2).

In step S4005, the CPU 101 executes a calculation for designating a pixel corresponding to a value (y−c), which is a value calculated by subtracting the sub scanning position y from the random number generation number-of-times count value c. More specifically, in step S4005, the CPU 101 executes a calculation for designating a pixel having coordinates (x, y−c) within the plane of the halftone image as a pixel having coordinates (x, y) of the halftone image that has been subjected to the variable magnification processing. Then the processing advances to step S2009.

On the other hand, in step S4003, the CPU 101 reads the random number stored when the random number position counter p=x in step S3005 from the random number buffer 109. In addition, the CPU 101 determines whether the read random number is smaller than the resulting remainder of division of the sub scanning position y by the unit of variable magnification processing. In other words, in step S4002, the CPU 101 determines whether the insertion of pixels within the unit of variable magnification processing at the main scanning position x of the halftone image that is currently scanned has been completed.

If it is determined that the read random number is smaller than the resulting remainder of division of the sub scanning position y by the unit of variable magnification processing (YES in step S4003), then the processing advances to step S4006. On the other hand, if it is determined that the read random number is equal to or greater than the resulting remainder of division of the sub scanning position y by the unit of variable magnification processing (NO in step S4003), then the processing advances to step S4007.

In step S4006, the CPU 101 executes a calculation for designating a pixel having a value (y+c+1), which is a value calculated based on the sub scanning position y, the random number generation number-of-times count value c, and one pixel to be thinned off. To paraphrase this, in step S4006, the CPU 101 executes a calculation for designating a pixel having coordinates (x, y+c+1) within the plane of the halftone image that is yet to be subjected to the variable magnification processing as a pixel of the halftone image that has been subjected to the variable magnification processing and having coordinates (x, y). Then the processing advances to step S2009 (FIG. 2).

In step S4007, the CPU 101 executes a calculation for designating a pixel corresponding to a value (y+c), which is a value calculated by adding the sub scanning position y to the random number generation number-of-times count value c. More specifically, in step S4007, the CPU 101 executes a calculation for designating a pixel having coordinates (x, y+c) within the plane of the halftone image as a pixel having coordinates (x, y) of the halftone image that has been subjected to the variable magnification processing. Then the processing advances to step S2009.

In step S2009, the CPU 101 instructs the coordinate values calculated by the calculation in step S2008 to the output buffer 110. Furthermore, the CPU 101 transfers the pixel of the halftone image stored on the output buffer 110 and having the instructed coordinate values to the printer unit 111. In step S2010, the CPU 101 increments the main scanning position x by 1. Then the processing advances to step S2007.

By executing the above-described processing, the pixel insertion or removal position (FIG. 10A) can be determined by controlling the distance L, which is a distance from the previous insertion or removal position in the direction of the variable magnification processing. As a result, the halftone image that has been subjected to the insertion or removal processing (FIG. 10B) can be output.

In the halftone image illustrated in FIG. 10B, dots can be appropriately distributed in the direction of variable magnification processing while reducing the length of the halftone image in the direction of variable magnification processing at portions in which dots may become unstable due to the lost balance of the dither pattern.

With the above-described configuration, the present exemplary embodiment can generate a stable halftone image that is not easily affected by the insertion or removal of pixels when pixels are inserted or removed therefrom by utilizing the random number.

In the random number table generation processing according to the first exemplary embodiment, the CPU 101 acquires a random number every time the main scanning position x is incremented by 1 in such a way as to have the difference between the random number generated by the random number generator 108 and the adjacent random number that is adjacent to the generated random number fall within the predetermined range.

In a second exemplary embodiment of the present invention, during the random number table generation processing, the CPU 101 uses the same number as the value read from a random number table corresponding to the previous main scanning position x as the value in the random number table corresponding to a main scanning position (x+1), which is copied thereto.

By using the same value in the random number table, the pixel insertion or removal positions are serially located adjacent to one another in the main scanning direction. In the present exemplary embodiment, a unit of main scanning processing N (N is a natural number) to determine how many times the same value is to be continuously used.

More specifically, in the present exemplary embodiment, the insertion or removal position is determined to have the insertion or removal positions to be serially located adjacent to one another by N times (the set unit of main scanning processing).

The unit of main scanning processing denotes the quantity of the insertion or removal positions serially located adjacent to one another in a direction perpendicular to the direction of variable magnification processing (i.e., in the sub scanning direction in the present exemplary embodiment). Furthermore, the unit of main scanning processing is a value used in determining the number of times of serially copying the same value stored on the random number buffer 109 during the random number table generation processing. For example, if the unit of main scanning processing is "5", the value to be stored on the random number buffer 109 is to be changed every five values.

The random number generator 108 is generally constituted by a shift register. Furthermore, the random number generated by the random number generator 108 is a pseudo random number. Accordingly, due to the size of the shift resister, the random number to be generated may have a periodicity as a pattern. The unit of main scanning processing is used to prevent the periodicity that the random number pattern may otherwise bear by adjusting the quantity of the random numbers to be generated.

In the present exemplary embodiment, the unit of main scanning processing is previously stored on the ROM 104 according to the screen ruling of the halftone image to prevent the insertion or thinning from being easily recognized by the user. For the unit of main scanning processing, the CPU 101 can acquire a value set by the user via the operation unit 102.

In the following description, random number table generation processing in step S2005 according to the present exemplary embodiment will be described in detail. The present exemplary embodiment has the same configuration as the configuration of the first exemplary embodiment except the random number table generation processing.

FIG. 5 is a flow chart illustrating an exemplary flow of the random number table generation processing in step S2005 according to the present exemplary embodiment. The processing illustrated in FIG. 5 is implemented by executing the processing by the random number generator 108 and by the CPU 101 by loading and executing a control program from the ROM 104 on the RAM 103.

Referring to FIG. 5, in step S5000, the CPU 101 executes initialization of a random number position counter p (p=0). In addition, the CPU 101 secures a buffer size of the random number buffer 109 according to the main scanning output size. In the present exemplary embodiment, the position on the random number buffer 109 is uniquely determined according to the random number position counter p.

In addition, the CPU 101 reads and refers to the unit of main scanning processing N from the ROM 104. Then the processing advances to step S5001.

In step S5001, the CPU 101 determines whether the random number position counter p is smaller than the main scanning output size stored on the RAM 103. If it is determined that the random number position counter p is smaller than the main scanning output size stored on the RAM 103 (YES in step S5001), then the processing advances to step S5002. On the other hand, if it is determined that the random number position counter p is equal to or greater than the main scanning output size (NO in step S5001), then the random number table generation processing ends and the processing advances to step S2006.

In step S5002, the CPU 101 determines whether the remainder of division of the random number position counter p by the unit of main scanning processing N is "0". If it is determined that the remainder of division of the random number position counter p by the unit of main scanning processing N is "0" (YES in step S5002), then the processing advances to step S5003. On the other hand, if it is determined that the remainder of division of the random number position counter p by the unit of main scanning processing N is not "0" (NO in step S5002), then the processing advances to step S5007.

In step S5007, the CPU 101 acquires the random number stored on the random number buffer 109 located at the location on the random number buffer 109 corresponding to the random number position counter (p−1). Then the processing advances to step S5006.

In step S5003, the random number generator 108 generates a random number. In addition, the CPU 101 acquires the random number generated by the random number generator 108. Then the processing advances to step S5004. In step S5004, the CPU 101 determines whether the random number acquired in step S5003 is less than the unit of variable magnification processing.

If it is determined that the acquired random number is less than the unit of variable magnification processing (YES in step S5004), then the processing advances to step S5004. On the other hand, if it is determined that the random number acquired in step S5003 is equal to or greater than the unit of variable magnification processing (NO in step S5004), then the processing returns to step S5003.

In step S5005, the CPU 101 determines whether the random number position counter p is "0". If the random number position counter p is "0" (YES in step S5005), then the processing advances to step S5006. On the other hand, if the random number position counter p is not "0" (NO in step S5005), then the processing advances to step S5008.

In step S5008, the CPU 101 determines whether the absolute value of the difference between the acquired random number and the random number stored at the location on the random number buffer 109 corresponding to the previous random number position counter (p−1) (an adjacent random number) is within a predetermined range (i.e., between a predetermined minimum value and a predetermined maximum value).

If it is determined that the absolute value of the difference is within the predetermined range (YES in step S5008), then the processing advances to step S5006. On the other hand, if it is determined that the absolute value of the difference exceeds the predetermined range (NO in step S5008), then the processing returns to step S5003. The predetermined minimum value and the predetermined maximum values are the same as those in the first exemplary embodiment.

In step S5006, the CPU 101 overwrites and stores the acquired random number at the location on the random number buffer 109 corresponding to the random number position counter p. Then the processing advances to step S5009. In step S5009, the CPU 101 increments the random number position counter p by 1. Then the processing returns to step S5001.

After executing the above-described processing, the insertion or removal positions are serially located adjacent to one another N times in the direction perpendicular to the direction of variable magnification processing (i.e., in the direction orthogonal to the variable magnification processing direction) as illustrated in FIG. 10A.

In other words, in the present exemplary embodiment, the CPU 101 functions as a serial-position determination unit configured to serially determine the insertion or removal positions N times by executing a series of processing in steps S5002, S5007, and S5006. In addition, in the present exemplary embodiment, the CPU 101 functions as a discrete-position determination unit configured to determine the next insertion or removal position by referring to the insertion or removal position determined by the previous operation by executing a series of processing in steps S5002 through S5005, S5008, and S5006.

With the above-described configuration, the present exemplary embodiment can control the insertion or thinning coordinates while restricting the quantity of the random numbers to be generated by the random number generator 108. As a result, the present exemplary embodiment can generate a stable halftone image.

In the above-described second exemplary embodiment, the unit of main scanning processing N is a predetermined constant. It is necessary to determine the unit of main scanning processing N according to the screen ruling of the halftone image. In a third exemplary embodiment of the present invention, to deal with a case where the screen ruling of a halftone image is not known, a random number is utilized in determining whether to locate the insertion or removal positions adjacent to one another without using a predetermined constant as the unit of main scanning processing N (the number of times N). In other words, the number of times N is determined at random. In the present exemplary embodiment, a predetermined default value (for example, "7") is stored on the ROM 104 as the number of times N.

In the following description, random number table generation processing in step S2005 according to the present exemplary embodiment will be described in detail. The present exemplary embodiment has the same configuration as the configuration of the first exemplary embodiment except the random number table generation processing.

FIG. 6 is a flow chart illustrating an exemplary flow of the random number table generation processing in step S2005 according to the present exemplary embodiment. The processing illustrated in FIG. 6 is implemented by executing the processing by the random number generator 108 and by the CPU 101 by loading and executing a control program from the ROM 104 on the RAM 103.

Referring to FIG. 6, in step S6000, the CPU 101 executes initialization of a random number position counter p (p=0). In addition, the CPU 101 secures a buffer size of the random number buffer 109 according to the main scanning output size. In the present exemplary embodiment, the position on the random number buffer 109 is uniquely determined according to the random number position counter p.

In addition, the CPU 101 reads the predetermined default value from the ROM 104 and stores the read value on the RAM 103. The predetermined default value stored on the RAM 103 is referred to by the CPU 101 where necessary.

In step S6001, the CPU 101 determines whether the random number position counter p is smaller than the main scanning output size stored on the RAM 103. If it is determined that the random number position counter p is smaller than the main scanning output size (YES in step S6001), then the processing advances to step S6002. On the other hand, if it is determined that the random number position counter p is equal to or greater than the main scanning output size (NO in step S6001), then the random number table generation processing ends and the processing advances to step S2006.

In step S6002, the CPU 101 generates a random number. Then the processing advances to step S6003. In step S6003, the CPU 101 determines whether the remainder of division of the random number generated in step S6002 by the predetermined default value is "0". If the remainder of division of the generated random number by the predetermined default value is "0" (YES in step S6003), then the processing advances to step S6004. On the other hand, if it is determined that the remainder of division of the generated random number by the predetermined default value is not "0" (NO in step S6003), then the processing advances to step S6008.

As a result of the determination in step S6003, it is determined how many times the insertion or removal positions are serially located adjacent to one another. In other words, the unit of main scanning processing N is controlled by the random number.

In step S6003, the processing can advance to step S6004 if the remainder is equal to or less than the half of the predetermined default value (i.e., even if the remainder is not "0"). In this case, in step S6003, if the remainder is greater than the half of the predetermined default value, the processing can advance to step S6008. To paraphrase this, the processing is not limited by how the random number generated by the CPU 101 is to be utilized.

In step S6008, the CPU 101 acquires the random number stored on the random number buffer 109 at the position thereon corresponding to the random number position counter (p−1). Then the processing advances to step S6007.

In step S6004, the random number generator 108 generates a random number. The CPU 101 acquires the random number by the random number generator 108. In step S6005, the CPU 101 determines whether the random number acquired in step S6004 is smaller than the unit of variable magnification processing.

If the acquired random number is smaller than the unit of variable magnification processing (YES in step S6005), then the processing advances to step S6006. On the other hand, if it is determined that the acquired random number is equal to or greater than the unit of variable magnification processing (NO in step S6005), then the processing returns to step S6004.

In step S6006, the CPU 101 determines whether the random number position counter p is "0". If the random number position counter p is "0" (YES in step S6006), then the processing advances to step S6007. On the other hand, if it is determined that the random number position counter p is not "0" (NO in step S6006), then the processing advances to step S6009.

In step S6009, the CPU 101 determines whether the absolute value of the difference between the acquired random number and the random number stored at the location on the random number buffer 109 corresponding to the previous random number position counter (p−1) (an adjacent random number) is within a predetermined range (i.e., between a predetermined minimum value and a predetermined maximum value).

If it is determined that the absolute value of the difference is within the predetermined range (YES in step S6009), then the processing advances to step S6007. On the other hand, if it is determined that the absolute value of the difference exceeds the predetermined range (NO in step S6009), then the processing returns to step S6004. The predetermined minimum value and the predetermined maximum values are the same as those in the first exemplary embodiment.

In step S6007, the CPU 101 overwrites and stores the acquired random number at the location on the random number buffer 109 corresponding to the random number position counter p. In step S6010, the CPU 101 increments the random number position counter p by 1. Then the processing returns to step S6001.

With the above-described configuration, the present exemplary embodiment can control the insertion or thinning coordinates while restricting the quantity of the random numbers to be generated by the random number generator 108 if the screen ruling utilized in the halftone image is unknown.

In the second exemplary embodiment, the quantity of random numbers to be generated by the random number generator 108 is restricted based on the predetermined unit of main scanning processing N. However, the image processing controller 107, which is included in the image processing apparatus, generally switches halftoning according to inner-plane information about a plane of an image having a continuous tone in generating a halftone image based on the image having a continuous tone.

The inner-plane information is information which may describe, for example, that a specific processing target region of a continuous tone image is a photograph region.

FIG. 7A illustrates a halftone image generated as described above. FIG. 7B illustrates exemplary inner-plane information about the halftone image.

The image processing controller 107 switches the screen ruling and the angle of the halftoning to be executed on the processing target region. Accordingly, it is useful if a value appropriate according to the inner-plane information about the processing target region is set as the range of the positions at which the pixels are to be inserted or thinned off and as the unit of main scanning processing. In a fourth exemplary embodiment of the present invention, each coefficient related to the variable magnification processing is changed according to the inner-plane information of an image.

In the following description, random number table generation processing in step S2005 according to the present exemplary embodiment will be described in detail. The present exemplary embodiment has the same configuration as the configuration of the first exemplary embodiment except the random number table generation processing.

In the present exemplary embodiment, a table, such as Table 1 described below, which stores a relationship among the inner-plane information and the variable magnification processing is previously stored on the ROM 104.

TABLE 1

| Image type | Minimum value | Maximum value | Unit of main scanning processing |
|---|---|---|---|
| Photograph | a | b | c |
| Graphic | d | e | f |
| Text | g | h | i |
| Background | j | k | l |

Table 1 will be described in detail below. Four image types, such as "photograph", "graphic", "text", and "background" are stored in Table 1. The minimum value, the maximum value, and the unit of main scanning processing are set to each image type.

For example, the image type "photograph" has the minimum value a, the maximum value b, and the unit of main scanning processing c set thereto. The other image types have the above-described values and the units of main scanning processing. The minimum value, the maximum value, and the unit of main scanning processing are used in steps S8009 and S8003, which will be described in detail below. The minimum value, the maximum value, and the unit of main scanning processing are the same as the predetermined minimum value and the predetermined maximum value in step S5008 and the unit of main scanning processing in step S5002 in the second exemplary embodiment.

Figure 8:
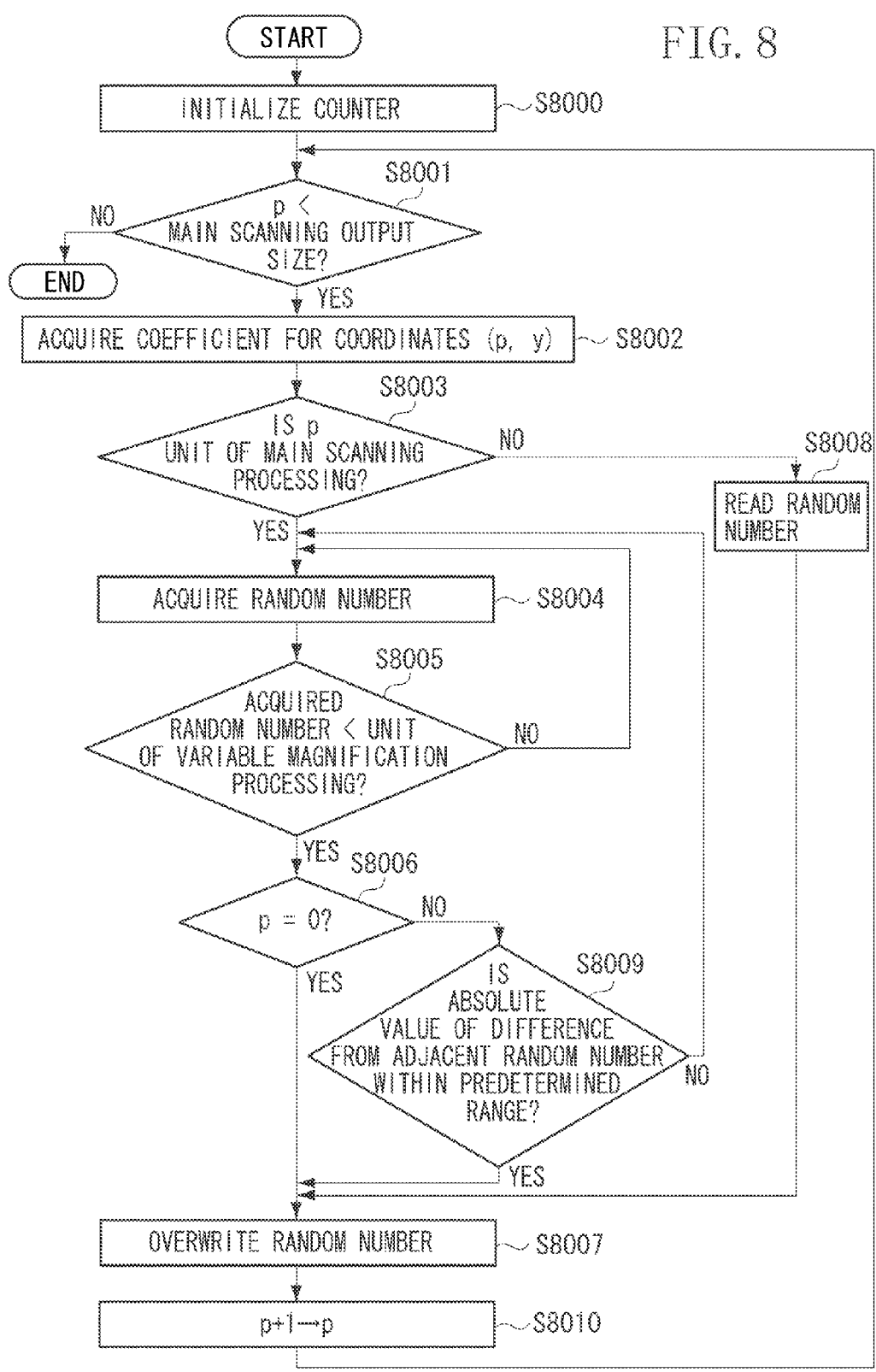
FIG. 8 is a flow chart illustrating exemplary variable magnification processing, which is executed according to the fourth exemplary embodiment, which illustrates processing in step S2005 in detail.

FIG. 8 is a flow chart illustrating an exemplary flow of the random number table generation processing in step S2005 according to the present exemplary embodiment. The processing illustrated in FIG. 8 is implemented by executing the processing by the random number generator 108 and by the CPU 101 by loading and executing a control program from the ROM 104 on the RAM 103.

Referring to FIG. 8, in step S8000, the CPU 101 executes initialization of a random number position counter p (p=0). In addition, the CPU 101 secures a buffer size of the random number buffer 109 according to the main scanning output size. In the present exemplary embodiment, the position on the random number buffer 109 is uniquely determined according to the random number position counter p. Then the processing advances to step S8001.

In step S8001, the CPU 101 determines whether the random number position counter p is smaller than the main scanning output size stored on the RAM 103. If it is determined that the random number position counter p is smaller than the main scanning output size stored on the RAM 103 (YES in step S8001), then the processing advances to step S8002. On the other hand, if it is determined that the random number position counter p is equal to or greater than the main scanning output size (NO in step S8001), then the random number table generation processing ends and the processing advances to step S2006.

In step S8002, the CPU 101 acquires inner-plane information (the image type) of the halftone image at coordinates (p, y), which correspond to the main scanning position x and the sub scanning position y corresponding to the random number position counter p. Furthermore, the CPU 101 acquires each coefficient from Table 1 stored on the ROM 104, such as the predetermined minimum value, the predetermined maximum value, and the unit of main scanning processing. Then the processing advances to step S8003.

In step S8003, the CPU 101 determines whether the remainder of division of the random number position counter p by the unit of main scanning processing acquired in step S8002 is "0". If it is determined that the remainder of division of the random number position counter p by the unit of main scanning processing acquired in step S8002 is "0" (YES in step S8003), then the processing advances to step S8004. On the other hand, if it is determined that the remainder of division of the random number position counter p by the unit of main scanning processing acquired in step S8002 is not "0" (NO in step S8003), then the processing advances to step S8008.

In step S8008, the CPU 101 acquires the random number stored on the random number buffer 109 at the position corresponding to the random number position counter (p−1). Then the processing advances to step S8007.

In step S8004, the random number generator 108 generates a random number. Furthermore, the CPU 101 acquires the random number generated by the random number generator 108. Then the processing advances to step S8005. In step S8005, the CPU 101 determines whether the random number acquired in step S8004 is smaller than the unit of variable magnification processing.

If it is determined that the acquired random number is smaller than the unit of variable magnification processing (YES in step S8005), then the processing advances to step S8006. On the other hand, if it is determined that the acquired random number is equal to or greater than the unit of variable magnification processing (NO in step S8005), then the processing returns to step S8004.

In step S8006, the CPU 101 determines whether the random number position counter p is "0". If the random number position counter p is "0" (YES in step S8006), then the processing advances to step S8007. On the other hand, if it is determined that the random number position counter p is not "0" (NO in step S8006), then the processing advances to step S8009.

In step S8009, the CPU 101 determines whether the absolute value of the difference between the acquired random number and the random number stored at the location on the random number buffer 109 corresponding to the previous random number position counter (p−1) (an adjacent random number) is within a predetermined range (i.e., between a predetermined minimum value and a predetermined maximum value acquired in step S8002).

If it is determined that the absolute value of the difference is within the predetermined range (YES in step S8009), then the processing advances to step S8007. On the other hand, if it is determined that the absolute value of the difference exceeds the predetermined range (NO in step S8009), then the processing returns to step S8004. The predetermined minimum value and the predetermined maximum values are the same as those in the first exemplary embodiment.

In step S8007, the CPU 101 overwrites and stores the acquired random number at the location on the random number buffer 109 corresponding to the random number position counter p. Then the processing advances to step S8010. In step S8010, the CPU 101 increments the random number position counter p by 1. Then the processing returns to step S8001.

With the above-described configuration, the present exemplary embodiment can utilize the insertion and interpolation method according to the inner-plane information (i.e., the halftoning method). As a result, the present exemplary embodiment can generate a stable halftone image.

The table storing the relationship between the image type and each coefficient is not limited to Table 1. More specifically, the size of the table can be changed according to the number of image types.

In the second exemplary embodiment, the quantity of random numbers to be generated by the random number generator 108 is restricted based on the predetermined unit of main scanning processing. However, in electrophotographic processing, the environment, such as a voltage or a fixing temperature set during recording, is changed according to the type of a recording medium used by the printer unit 111.

The recording environment, such as a voltage or a fixing temperature, may take an effect on dots of a halftone image to be formed. As a result, the variable magnification processing according to an exemplary embodiment of the present invention executed by the insertion and thinning method may be affected.

To solve the above-described issue, in a fifth exemplary embodiment of the present invention, the image processing apparatus changes the coefficients related to the variable magnification processing according to the type of a recording medium.

In the following description, random number table generation processing in step S2005 according to the present exemplary embodiment will be described in detail. The present exemplary embodiment has the same configuration as the configuration of the first exemplary embodiment except the random number table generation processing.

In the present exemplary embodiment, a table, such as Table 2 described below, which stores a relationship among the recording medium and the coefficients related to the variable magnification processing is previously stored on the ROM 104. Information about the type of a recording medium is set by the user via the operation unit 102. The CPU 101 stores the setting information on the RAM 103.

TABLE 2

| Medium type | Minimum value | Maximum value | Unit of main scanning processing |
|---|---|---|---|
| Paper type A | a | b | c |
| Paper type B | d | e | f |
| Paper type C | g | h | i |
| Paper type D | j | k | l |

Table 2 will be described in detail below. Four image types, such as "paper type A", "paper type B", "paper type C", and "paper type D" are stored in Table 2. The minimum value, the maximum value, and the unit of main scanning processing are set to each medium type.

For example, the medium type "paper type A" has the minimum value a, the maximum value b, and the unit of main scanning processing c set thereto. The other medium types have the above-described values and the unit of main scanning processing. The minimum value, the maximum value, and the unit of main scanning processing are used in steps S9009 and S9003, which will be described in detail below. The minimum value, the maximum value, and the unit of main scanning processing are the same as the predetermined minimum value and the predetermined maximum value in step S5008 and the unit of main scanning processing in step S5002 in the second exemplary embodiment.

Figure 9:
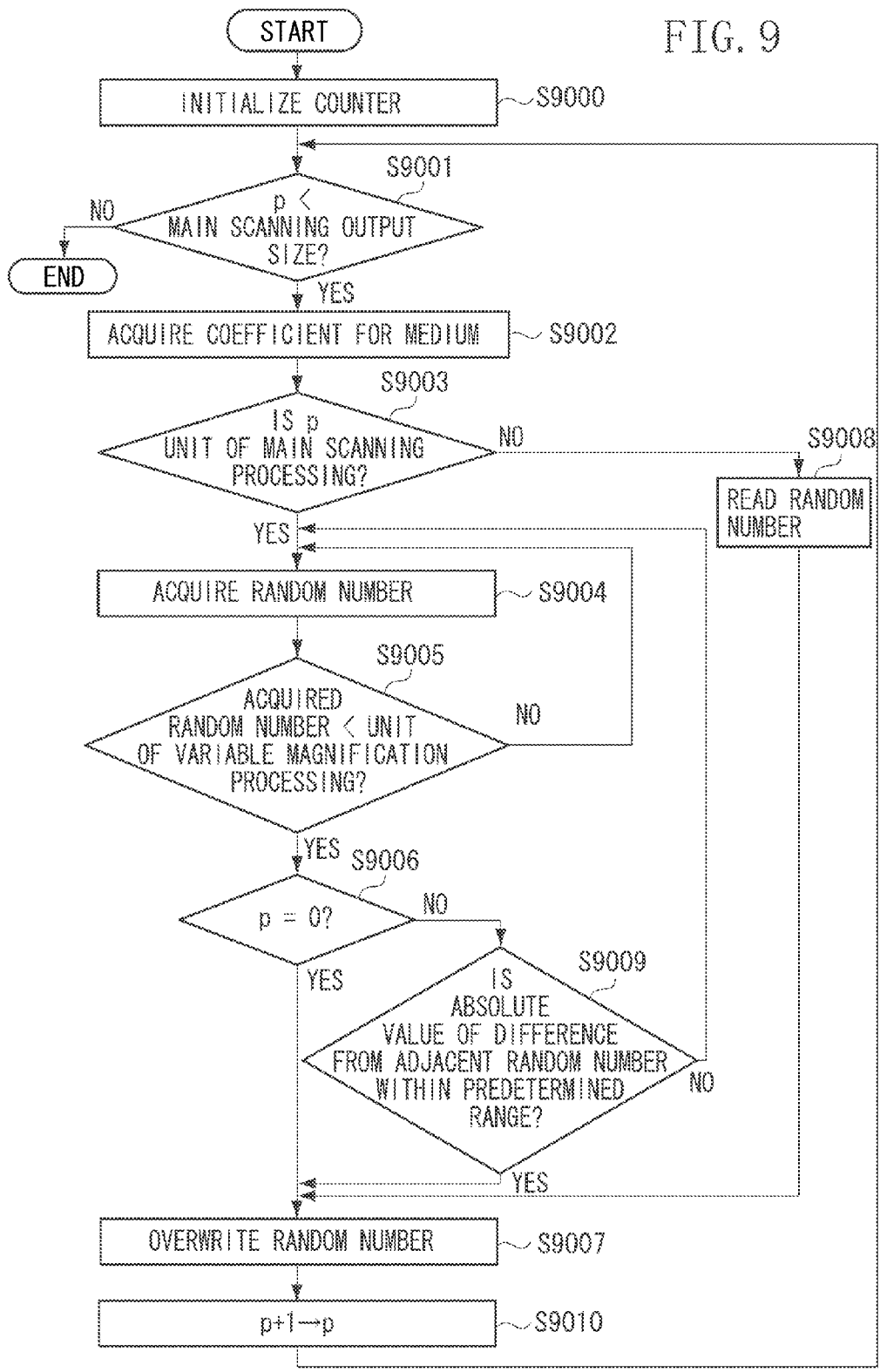
FIG. 9 is a flow chart illustrating exemplary variable magnification processing, which is executed according to a fifth exemplary embodiment of the present invention, which illustrates processing in step S2005 in detail.
Figure 11A:
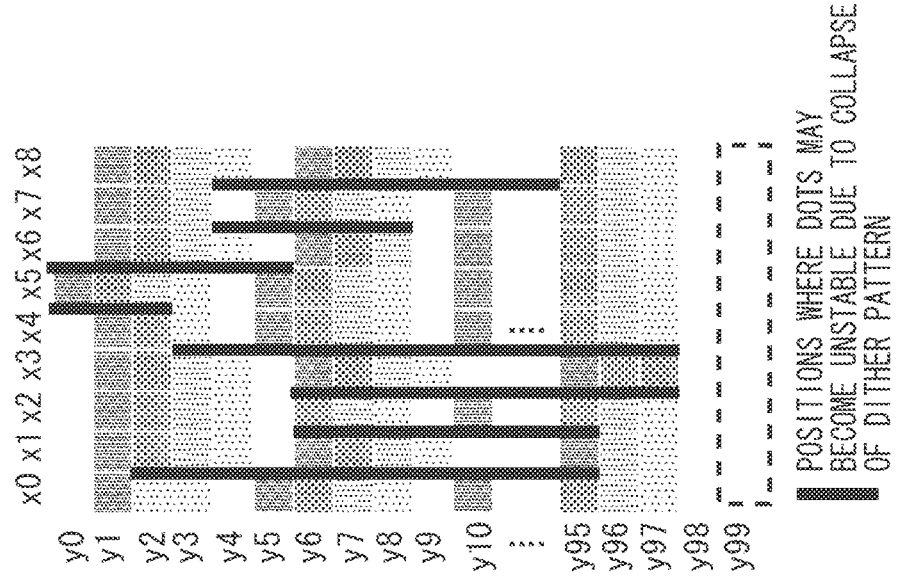
FIGS. 11A and 11B illustrate variable magnification processing according to a conventional method, which is executed by thinning pixels.
Figure 11B:
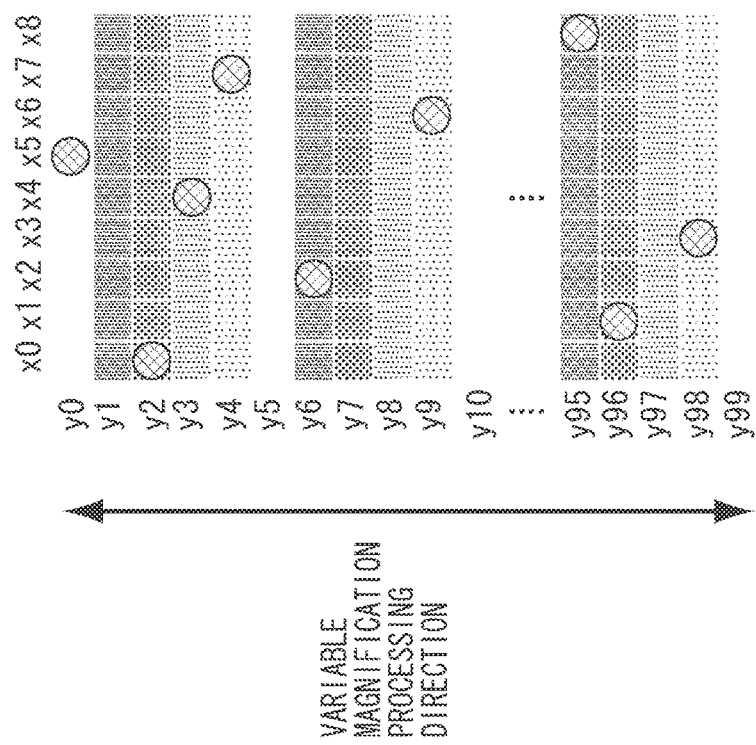

FIG. 9 is a flow chart illustrating an exemplary flow of the random number table generation processing in step S2005 according to the present exemplary embodiment. The processing illustrated in FIG. 9 is implemented by executing the processing by the random number generator 108 and by the CPU 101 by loading and executing a control program from the ROM 104 on the RAM 103.

Referring to FIG. 9, in step S9000, the CPU 101 executes initialization of a random number position counter p (p=0). In addition, the CPU 101 secures a buffer size of the random number buffer 109 according to the main scanning output size. In the present exemplary embodiment, the position on the random number buffer 109 is uniquely determined according to the random number position counter p.

In step S9001, the CPU 101 determines whether the random number position counter p is smaller than the main scanning output size stored on the RAM 103. If it is determined that the random number position counter p is smaller than the main scanning output size stored on the RAM 103 (YES in step S9001), then the processing advances to step S9002. On the other hand, if it is determined that the random number position counter p is equal to or greater than the main scanning output size (NO in step S9001), then the random number table generation processing ends and the processing advances to step S2006.

In step S9002, the CPU 101 reads the medium type (paper type) from the RAM 103. Furthermore, the CPU 101 acquires coefficients, such as the predetermined minimum value, the predetermined maximum value, and the unit of main scanning processing, which correspond to the medium type read from Table 2, which is stored on the ROM 104.

In step S9003, the CPU 101 determines whether the remainder of division of the random number position counter p by the unit of main scanning processing acquired in step S9002 is "0". If it is determined that the remainder of division of the random number position counter p by the unit of main scanning processing acquired in step S9002 is "0" (YES in step S9003), then the processing advances to step S9004. On the other hand, if it is determined that the remainder of division of the random number position counter p and by unit of main scanning processing acquired in step S9002 is not "0" (NO in step S9003), then the processing advances to step S9008.

In step S9008, the CPU 101 acquires the random number stored on the random number buffer 109 at the position corresponding to the random number position counter (p−1). Then the processing advances to step S9007.

In step S9004, the random number generator 108 generates a random number. Furthermore, the CPU 101 acquires the random number generated by the random number generator 108. Then the processing advances to step S9005. In step S9005, the CPU 101 determines whether the random number acquired in step S9004 is smaller than the unit of variable magnification processing.

If it is determined that the acquired random number is smaller than the unit of variable magnification processing (YES in step S9005), then the processing advances to step S9006. On the other hand, if it is determined that the acquired random number is equal to or greater than the unit of variable magnification processing (NO in step S9005), then the processing returns to step S9004.

In step S9006, the CPU 101 determines whether the random number position counter p is "0". If the random number position counter p is "0" (YES in step S9006), then the processing advances to step S9007. On the other hand, if it is determined that the random number position counter p is not "0" (NO in step S9006), then the processing advances to step S9009.

In step S9009, the CPU 101 determines whether the difference between the acquired random number and the random number stored at the location on the random number buffer 109 corresponding to the previous random number position counter (p−1) (an adjacent random number) is within a predetermined range (i.e., between a predetermined minimum value and a predetermined maximum value acquired in step S9002).

If it is determined that the difference is within the predetermined range (YES in step S9009), then the processing advances to step S9007. On the other hand, if it is determined that the difference exceeds the predetermined range (NO in step S9009), then the processing returns to step S9004. The predetermined minimum value and the predetermined maximum values are the same as those in the first exemplary embodiment.

In step S9007, the CPU 101 overwrites and stores the acquired random number at the location on the random number buffer 109 corresponding to the random number position counter p. Then the processing advances to step S9010. In step S9010, the CPU 101 increments the random number position counter p by 1. Then the processing advances to step S9001.

As described above, the present exemplary embodiment acquires the coefficients according to the medium type. However, in combination with the technical idea of the fourth exemplary embodiment, a table storing both the inner-plane information and the medium type can be previously stored on the ROM 104 and the CPU 101 can refer to the table where necessary.

With the above-described configuration, the present exemplary embodiment can utilize the insertion and interpolation processing method according to the type of a recording medium. As a result, the present exemplary embodiment can generate a stable halftone image.

The table storing the relationship between the medium type and each coefficient is not limited to Table 2. More specifically, the size of the table can be changed according to the number of medium types.

The present invention can also be achieved by providing a system or an apparatus with software (a program) that can implement the functions of the above-described embodiments via a network or via various types of storage media and by reading and executing the program stored on the storage medium with a computer of the system or the apparatus (a CPU or an micro processing unit (MPU)).

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-271696 filed Dec. 6, 2010, which is hereby incorporated by reference herein in its entirety.

What is claimed is:

1. An image processing apparatus which removes pixels included in an image to output the image having been reduced in a sub scanning direction, comprising:
   a processor;
   a memory storing instructions to be executed by the processor; and
   a random number generator for generating a random number;
wherein the processor is configured to controls, according to the instructions, the image processing apparatus to function as:
   an obtaining unit configured to obtain the image including a plurality of columns of pixels arranged in the sub scanning direction, one and another of the plurality of columns being adjacent to each other in a main scanning direction;
   a holding unit configured to hold distance information;
   a determination unit configured to determine removal positions in the one and another columns, wherein the determination unit is configured to refer the determined removal position in the one column, and determine, on a basis of the referred removal position, the held distance information and the generated random number, the removal position in the another column so that the removal position in the another column is distant from the removal position in the one column in the sub scanning direction at least by a distance indicated by the held distance information; and a processing unit configured to remove at least pixels located at the determined removal positions in the one and another columns to output the image having been reduced in the sub scanning direction.

2. The image processing apparatus according to claim 1, wherein the predetermined distance is determined on the basis of inner-plane information about the image.

3. The image processing apparatus according to claim 1, wherein the predetermined distance is determined on the basis of information used for identifying a type of a sheet on which the image that has been scaled by the processing unit is printed.

4. The image processing apparatus according to claim 1, further comprising a printer unit configured to print images on both surfaces of a sheet.

5. The image processing apparatus according to claim 1, wherein the image is an image on which a halftoning process has been performed.

6. The image processing apparatus according to claim 1, further comprising:
  a division unit configured to divide the image into a plurality of regions, a width and a height of each region being equal to a width of the image and a predetermined height, respectively, and each region of the plurality of the regions including a plurality of columns aligned laterally;
  wherein, for each of the divided regions, the determination unit and the processing unit perform the determination and the removal, respectively.

7. The image processing apparatus according to claim 6, further comprising:
  a setting unit configured to set a scale rate of the image, wherein the division unit determines the height of each of the regions on the basis of the set scale rate.

8. The image processing apparatus according to claim 1, further comprising:
  a first setting unit configured to set a scale rate of the image; and
  a second setting unit configured to set a length of each of the plurality of columns according to the set scale rate.

9. The image processing apparatus according to claim 1, wherein a length of the one column is same as a length of the another column.

10. The image processing apparatus according to claim 1, wherein an image and another image are respectively printed on a front surface and a back surface of a sheet,
  wherein the processing unit performs the removal of pixels in the another image.

11. A method for removing pixels included in an image to output the image having been reduced in a sub scanning direction, the method comprising:
  obtaining the image including a plurality of columns of pixels arranged in the sub scanning direction, one and another of the plurality of columns being adjacent to each other in a main scanning direction;
  determining a removal position in the one column;
  generating a random number by a random number generator; holding distance information;
  referring the determined removal position in the one column;
  determining, on a basis of the referred removal position, the distance information and the generated random number, a removal position in the another column so that the removal position in the another column is distant from the removal position in the one column in the sub scanning direction at least by a distance indicated by the held distance information; and
  removing pixels located at the determined removal positions in the one and another columns to output the image having been reduced in the sub scanning direction.

* * * * *